(12) United States Patent
Didier et al.

(10) Patent No.: US 7,620,187 B1
(45) Date of Patent: Nov. 17, 2009

(54) METHOD AND APPARATUS FOR AD HOC CRYPTOGRAPHIC KEY TRANSFER

(75) Inventors: Patrick Francis Didier, Marion, IA (US); Ray Lynn Cross, Cedar Rapids, IA (US); Roger Charles Odell, Oceanside, CA (US); Stephen Edward Ossenkop, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 981 days.

(21) Appl. No.: 11/096,700

(22) Filed: Mar. 30, 2005

(51) Int. Cl.
*H04L 9/00* (2006.01)

(52) U.S. Cl. ............................ 380/279; 380/247

(58) Field of Classification Search ............... 380/277, 380/278, 279, 281, 282, 286, 247; 713/175, 713/173
See application file for complete search history.

(56) References Cited

U.S. PATENT DOCUMENTS

| | | | |
|---|---|---|---|
| 4,405,829 A | 9/1983 | Rivest | |
| 5,144,667 A | 9/1992 | Pogue | |
| 5,724,428 A | 3/1998 | Rivest | |
| 5,835,600 A | 11/1998 | Rivest | |
| 5,903,649 A | 5/1999 | Schwenk | |
| 5,991,415 A | 11/1999 | Shamir | |
| 6,026,163 A | 2/2000 | Micali | |
| 6,269,163 B1 | 7/2001 | Rivest | |
| 6,956,950 B2* | 10/2005 | Kausik | 380/277 |
| 6,985,583 B1 | 1/2006 | Brainard | |
| 7,016,499 B2* | 3/2006 | Perlman | 380/281 |
| 7,065,210 B1 | 6/2006 | Tsujii | |
| 7,082,536 B2* | 7/2006 | Filipi-Martin et al. | 713/171 |
| 7,181,016 B2* | 2/2007 | Cross et al. | 380/281 |
| 7,212,632 B2 | 5/2007 | Scheidt | |
| 7,240,202 B1 | 7/2007 | Orman | |
| 7,269,261 B1 | 9/2007 | Jennings | |
| 7,269,736 B2 | 9/2007 | Howard | |
| 7,409,543 B1* | 8/2008 | Bjorn | 713/155 |
| 2001/0014158 A1* | 8/2001 | Baltzley | 380/281 |
| 2003/0235309 A1* | 12/2003 | Struik et al. | 380/278 |
| 2005/0271210 A1* | 12/2005 | Soppera | 380/277 |
| 2007/0127723 A1* | 6/2007 | Grobman | 380/278 |
| 2007/0192397 A1 | 8/2007 | Lauter | |

FOREIGN PATENT DOCUMENTS

WO    WO 0245340    6/2002

\* cited by examiner

*Primary Examiner*—Beemnet W Dada
(74) *Attorney, Agent, or Firm*—Daniel M. Barbieri

(57) ABSTRACT

Method and apparatus for obtaining a cryptographic key by dispatching a key request to a communications channel, receiving a response from one or more key sources, selecting a key source according to the received responses, preparing a requester credential, communicating the requester credential to the selected key source, receiving a source credential from the selected key source, receiving an encrypted key from the key source and decrypting the encrypted key source according to the received source credential, the requester credential and a pre-placed certificate.

21 Claims, 14 Drawing Sheets

METHOD AND APPARATUS FOR AD HOC CRYPTOGRAPHIC KEY TRANSFER

GOVERNMENTAL RIGHTS

The Government of the United States of America may have property rights in the method and apparatus claimed herein since development of this technology was conducted under Contract No. F33615-01-C-1856 issued by USAF/AFMC, Air Force Research Laboratory/SNKD, 2310 Eighth Street, Building 167, Wright-Patterson AFB OH 45433-7801. The Government contact for this contract Dawn M. Ross can be reached by phone at (937) 255-5252 or by electronic mail at dawn.ross@ws.wpafb.af.mil.

BACKGROUND

Cryptographic systems rely on encryption keys. In order to maintain high levels of security, an encryption key needs to be updated on a periodic basis. Updating cryptographic keys is most effectively accomplished by communicating a cryptographic keys to two different users in a manner that ensures that the cryptographic keys are not compromised. Once the cryptographic keys are received by the two different users, those users can communicate with each other in a secure manner in reliance of the fact that the keys provided to each user are a complimentary set and are only known to the two users participating in a secure communications session.

It is ordinarily appreciated that information is often encrypted before it is transmitted to a remote user. Military systems are just an example of the many types of applications where data (i.e. information) needs to be encrypted before it is conveyed to a remote user. Because the success of a mission can pivot on the security of communications used to control the application of resources in a battle theatre, the persistent use of an encryption key may not provide the high level of security desired in these types of applications. For this reason, a cryptographic key is often used only for a little while; for example for a day or two or maybe even for just a few hours.

The dilemma in these types of applications is that it is difficult or even impossible to provide replacement cryptographic keys to users that are deployed in a field of operation. There have been many techniques postulated to provide for enhanced security in these types of applications. For example, one known method relies on seeding a plurality of encryption keys in each of a first and second user's communications system. For example, two different radio sets can be seeded with 10 different complimentary key sets. Then, whenever the theatre of operation so dictates, a different complimentary key set is selected (e.g. a new key set is selected once per day). This method still requires that new key sets be provided to the actual hardware radio through in a secure manner. One such secure manner accomplishes seeding a cryptographic key into a radio by means of a data transfer device (DTD), which is a trusted hardware apparatus that conveys key sets to a user apparatus using a physical interface.

It can immediately be appreciated that this method, in order to be effective, requires extensive logistical planning and support. Even more important, such prior art methods can quickly be overwhelmed in situations where immediate battle readiness is required and where there simply is not enough time to physically replenish cryptographic keys to all of the resources that may need new encryption and decryption keys.

SUMMARY

Presently disclosed are a method and apparatus for obtaining a cryptographic key by dispatching a key request to a communications channel, receiving a response from one or more key sources, selecting a key source according to the received responses, preparing a requester credential, communicating the requester credential to the selected key source, receiving a source credential from the selected key source, receiving an encrypted key from the key source and decrypting the encrypted key source according to the received source credential, the requester credential and a pre-placed certificate.

BRIEF DESCRIPTION OF THE DRAWINGS

The present invention will hereinafter be described in conjunction with the appended drawings and figures, wherein like numerals denote like elements, and in which.

DETAILED DESCRIPTION

Although there exist many various methods for obtaining a cryptographic key, known methods for obtaining a cryptographic key are dependent upon system specific attributes. What this means is that there has been no practical method developed for obtaining cryptographic keys by a common method for a plurality of security services and/or security levels. The present method supports an ad hoc structure for obtaining a cryptographic key irrespective of a particular type of security service or security level.

Figure 1:
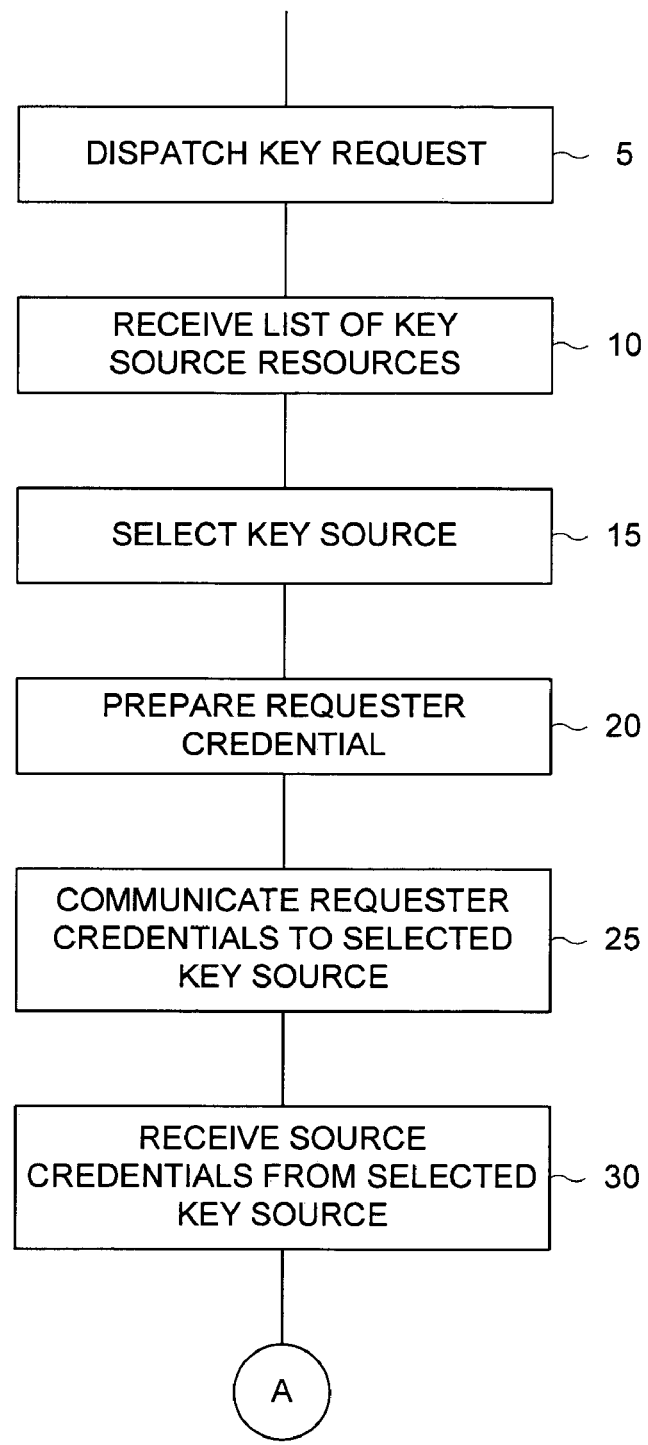
FIGS. 1 and 2 collectively form a flow diagram that depicts one example method for obtaining a cryptographic key.
Figure 2:
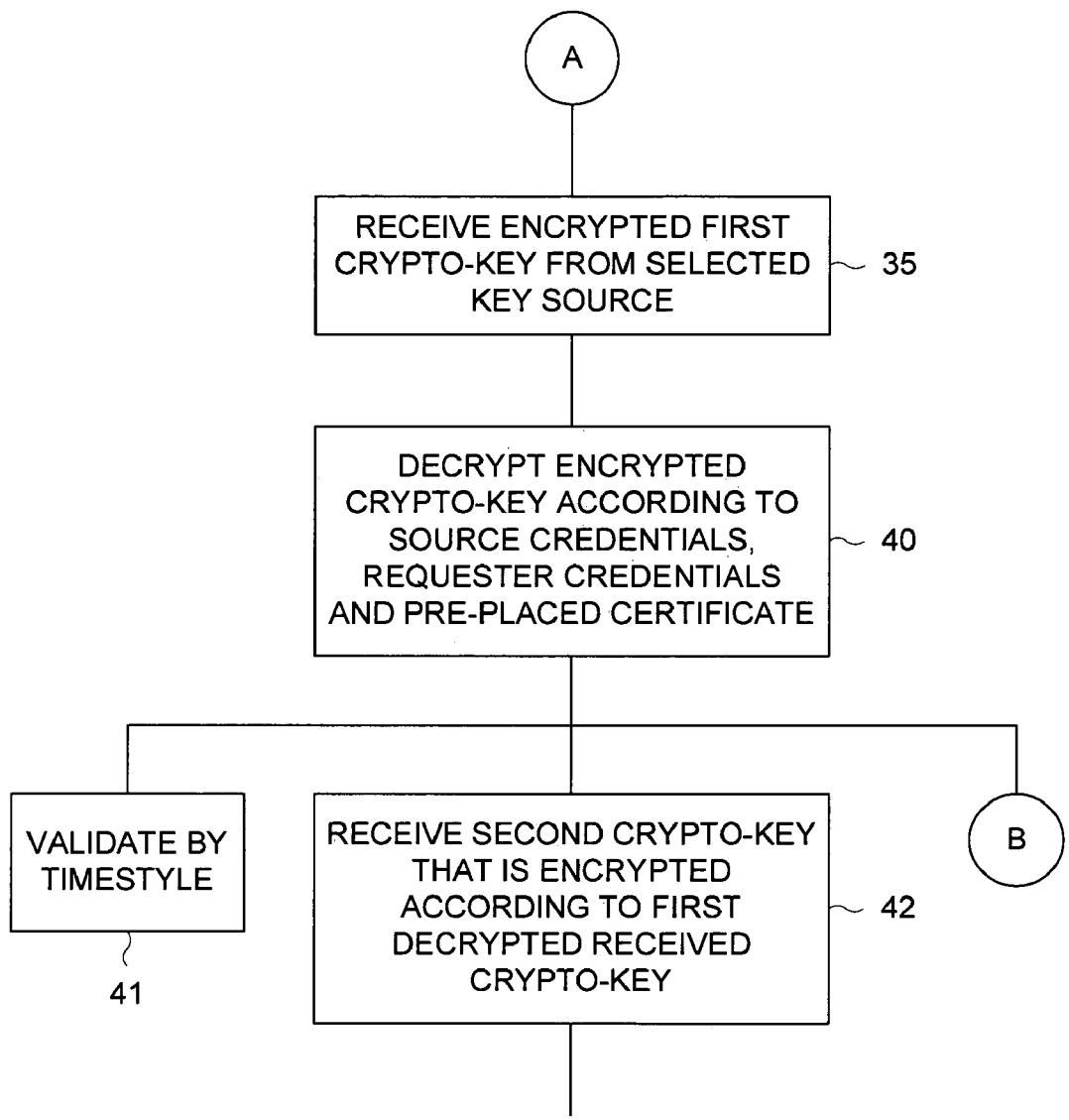

FIGS. 1 and 2 collectively form a flow diagram that depicts one example method for obtaining a cryptographic key. According to this example method, a cryptographic key is obtained by dispatching a key request (step 5). It should be appreciated that, according to this example variation of the present method, a key request is directed to a communications channel. A list of one or more key sources is then received (step 10). A key source is then selected from amongst the one or more key sources included in a received list of key sources (step 15).

Once a key source is selected, a requester credential is then prepared (step 20). It should be appreciated that, according to this example variation of the present method, a requester credential is typically associated with a remote terminal that is in need of obtaining a new cryptographic key. The requester credential is then directed to the selected key source (step 25). It should likewise be appreciated that, according to one variation of the present method, the requester credential is directed to a communications channel, which is established between a requester and a selected key source.

According to this example method, a key source will receive the requester credential and respond with a source credential corresponding to the key source which was selected by the requester to provide a cryptographic key. Accordingly, a source credential is then received from the selected key source (step 30). A first encrypted cryptographic key (crypto-key) is also received from the selected key source (step 35). The encrypted first crypto-key is then decrypted. The encrypted first crypto-key is decrypted according to the source credential received from the key source, the requester credential originally communicated to the key source and also according to a pre-placed certificate.

Figure 3:
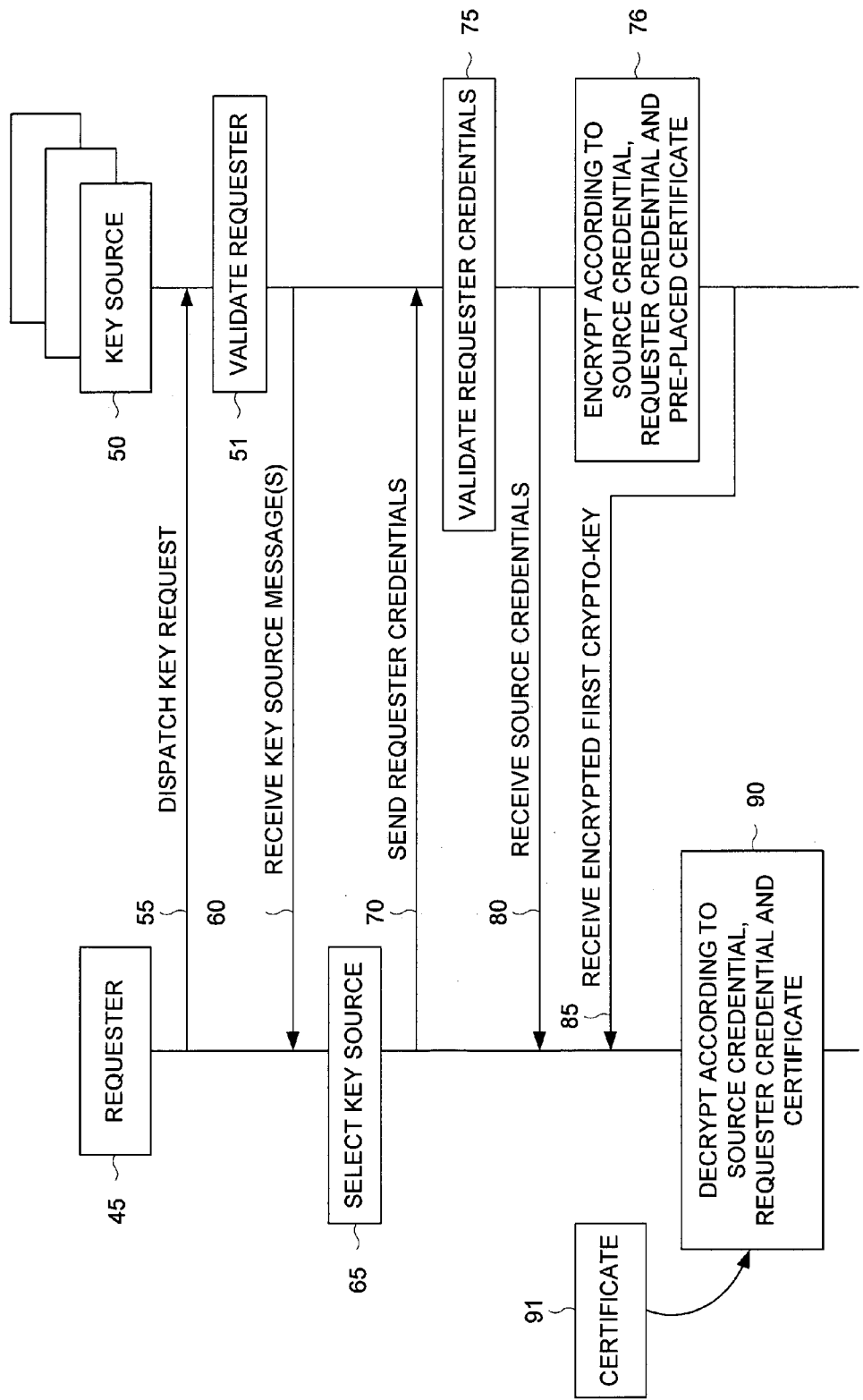
FIG. 3 is a message diagram that illustrates communications between a requester and a key source in one illustrative use case.

FIG. 3 is a message diagram that illustrates communications between a requester and a key source in one illustrative use case. It should be appreciated that the present method is applicable in a wide variety of applications. A requester 45, according to one illustrative use case, comprises a remote secure terminal. The term "secure terminal" itself is used to refer to wide variety of different types of apparatus. For example, a secure terminal, according to one example use case, includes a joint tactical radio system (JTRS) terminal. It should be appreciated that the present method is not intended to be limited in application to any particular application presented herein. Accordingly, the claims appended hereto are not intended to be limited to any references to a particular illustrative use case such as the joint tactical radio system. A requester includes any secure terminal that might be imagined. For example, a secure terminal, according to yet another illustrative use case, comprises a notebook computer that executes a computer program which embodies the present method. A key source 15, according to one illustrative use case, comprises a mobile command center. A key source 15, according to yet another illustrative use case, comprises a central key distribution facility. Again, the present method may be applied in a wide variety of business, commercial and military applications.

In operation, the requester 45 typically uses a communications channel to dispatch a key request 55. According to one alternative example variation of the present method, the key request is dispatched 55 in a broadcast manner. As such, the key request is not directed to a particular key source. A key source then validates a key request according to a requester identifier (step 51). In this variation of the present method, one or more key sources 50 respond to a received key request once the key requester is validated. Each key source, according to this variation of the present method, responds with a key source message that is used to identify an available key source. In yet another example variation of the present method, the key request is dispatched to 55 to a key source manager. In this alternative example variation of the present method, a key source manager then provides a list of available key sources.

It should be appreciated that, according to yet another example variation of the present method, a key request and all subsequent communications between a requester 45 and a key source 50 are carried by a secure communications channel. One example of a secure communications channel relies on modifying a modulated carrier according to a secure algorithm. For example, one secure communications channel generates a carrier that is modulated according to information that is directed from the requester 45 to a key source 50. In this example, the frequency of the modulated carrier is constantly varied according to a random sequence. This is commonly known as spread spectrum communications. By securing a random sequence that is used to adjust the frequency of the modulated carrier, the communications channel is made secure. Various alternative methods can be used to modify a carrier in a secure manner. According to one example variation of the present method, a carrier is modified in frequency as herein described. According to yet another example variation of the present method, a carrier is modified in phase. And in yet another example variation of the present method, a carrier is modified in amplitude. Again, modification of a carrier that is modulated according to information to be communicated between a requester 45 and a key source 50 is accomplished according to a secure algorithm. According to yet another example variation, such modification of a carrier is accomplished according to a standard known as "TRANSEC". It should likewise be appreciated that, according to one variation of the present method, a carrier is modified by modifying at least one of a frequency, a phase, an amplitude, a start time, jitter, encoding code, modulation code, modulation type, polarization modulation, pulse rise time, pulse fall time, bit ordering and interleaving exhibited by the modulated carrier according to a secure algorithm.

Once the requester 45 receives a list of available key sources or is able to otherwise identify individual key sources by key source identification messages, the requester 45 then selects a key source 65. The requester 45 then sends a requester credential 70 to a selected key source 50. According to this example method, the key source 50 then validates the requester credentials 75. The key source 50 then provides source credentials 80 along with a first cryptographic key 85. It should be appreciated that the first cryptographic key is encrypted. Once the requester 45 receives a source credentials 80 and the first encrypted crypto-key 85, it then decrypts the encrypted cryptographic key 90. It should be appreciated that, according to this example method, the requester 45 decrypts the encrypted key according to the source credential it received from the key source, the requester credential that it conveyed to the key source and a pre-placed certificate 91.

Figure 4:
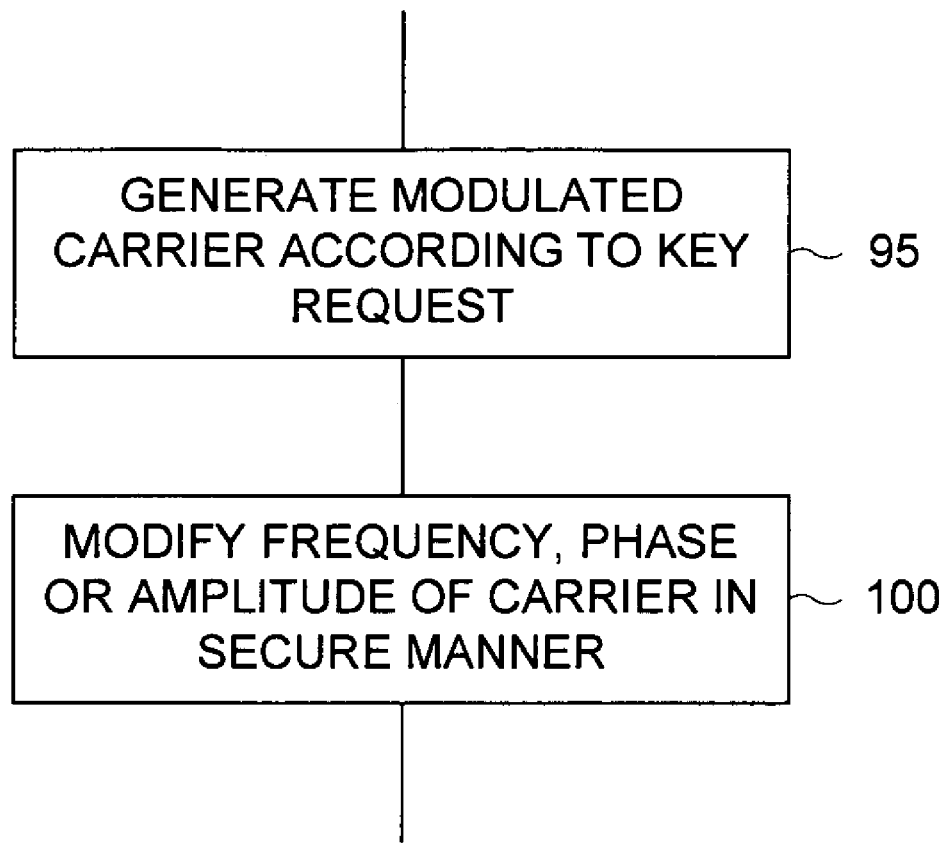
FIG. 4 is a flow diagram that depicts one alternative example method for dispatching a key request.

FIG. 4 is a flow diagram that depicts one alternative example method for dispatching a key request. According to this alternative example method, a key request is dispatched to a communications channel by generating a modulated carrier. It should be appreciated that the carrier is modulated according to the key request (step 95). Commensurate with the teachings provided above, this alternative example variation of the present method provides for modifying at least one of the frequency, a phase and in amplitude exhibited by the carrier. It should likewise be appreciated that, according to this alternative example method, modification of frequency, phase or amplitude is accomplished in a secure manner (step 100). As such, modification of frequency, phase or amplitude of a carrier is accomplished according to a secure algorithm. According to one variation of the present method, modification of a carrier is accomplished by modifying at least one of a frequency, a phase, an amplitude, a start time, jitter, encoding code, modulation code, modulation type, polarization modulation, pulse rise time, pulse fall time, bit ordering and interleaving exhibited by the modulated carrier according to a secure algorithm.

Figure 5:
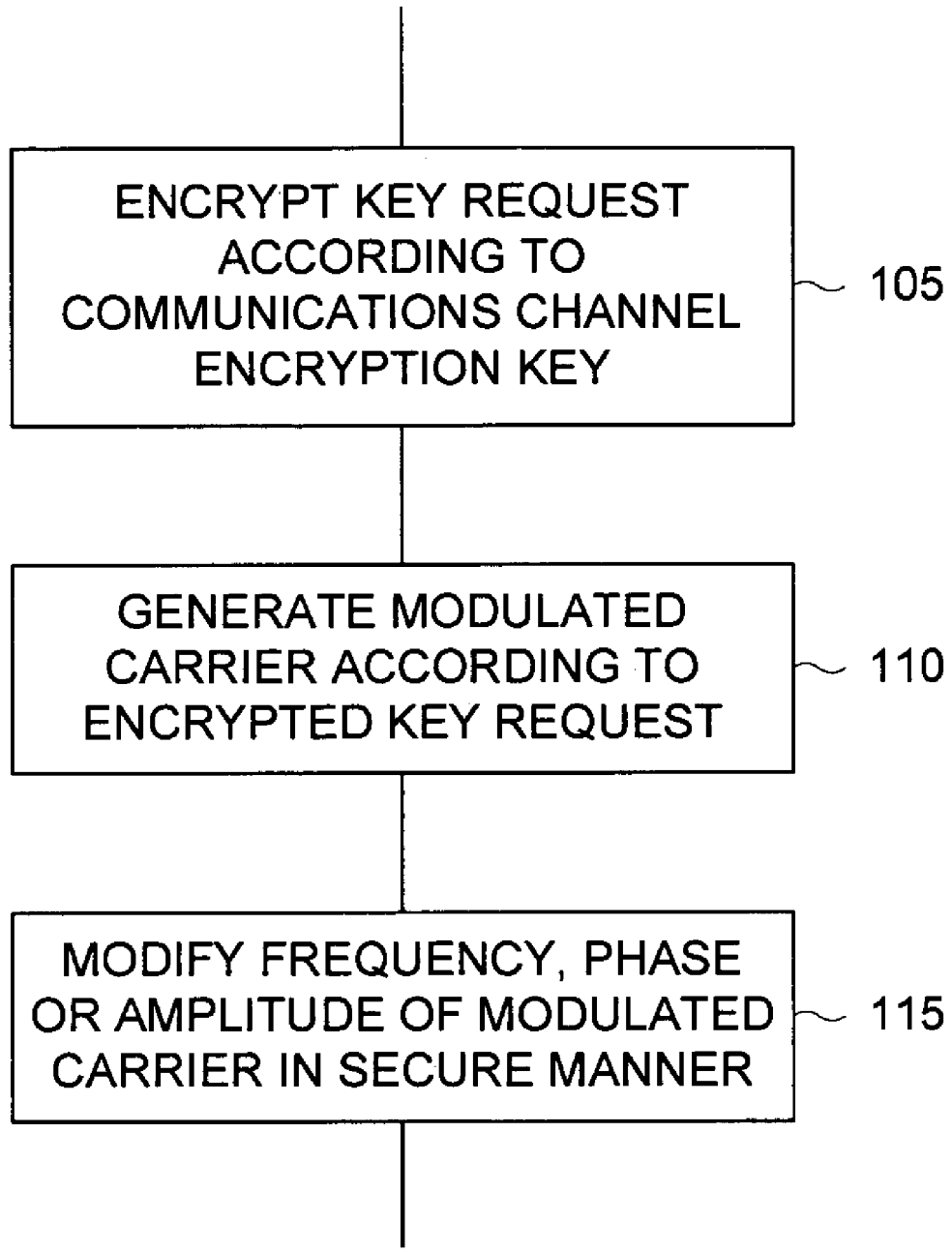
FIG. 5 is a flow diagram that depicts an alternative example method for dispatching a key request using a communications channel encryption key.

FIG. 5 is a flow diagram that depicts an alternative example method for dispatching a key request using a communications channel encryption key. It should be appreciated that the alternative method described above relative to FIG. 4 comprises one example method for conveying a key request by means of a secure channel. It should likewise be appreciated that the method described in FIG. 4 supports conveyance of information in a secure manner. This security (i.e. as described in FIG. 4) provides a first layer of protection. According to this alternative example method, a message that comprises a key request is first encrypted according to a communications channel encryption key (step 105). Once the message comprising the key request is encrypted, the encrypted message is then used as a basis for modulating a carrier (step 110). A carrier which is modulated according to the encrypted key request is then itself modified according to a secure algorithm. Accordingly, the modulated carrier is modified in at least one of frequency, phase and amplitude. By first encrypting a key request, an additional layer of protection is provided for conveyance of a key request. According to one variation of the present method, modification of a carrier is accomplished by modifying at least one of a frequency, a phase, an amplitude, a start time, jitter, encoding code, modulation code, modulation type, polarization modulation, pulse rise time, pulse fall time, bit ordering and interleaving exhibited by the modulated carrier according to a secure algorithm.

Figure 6:
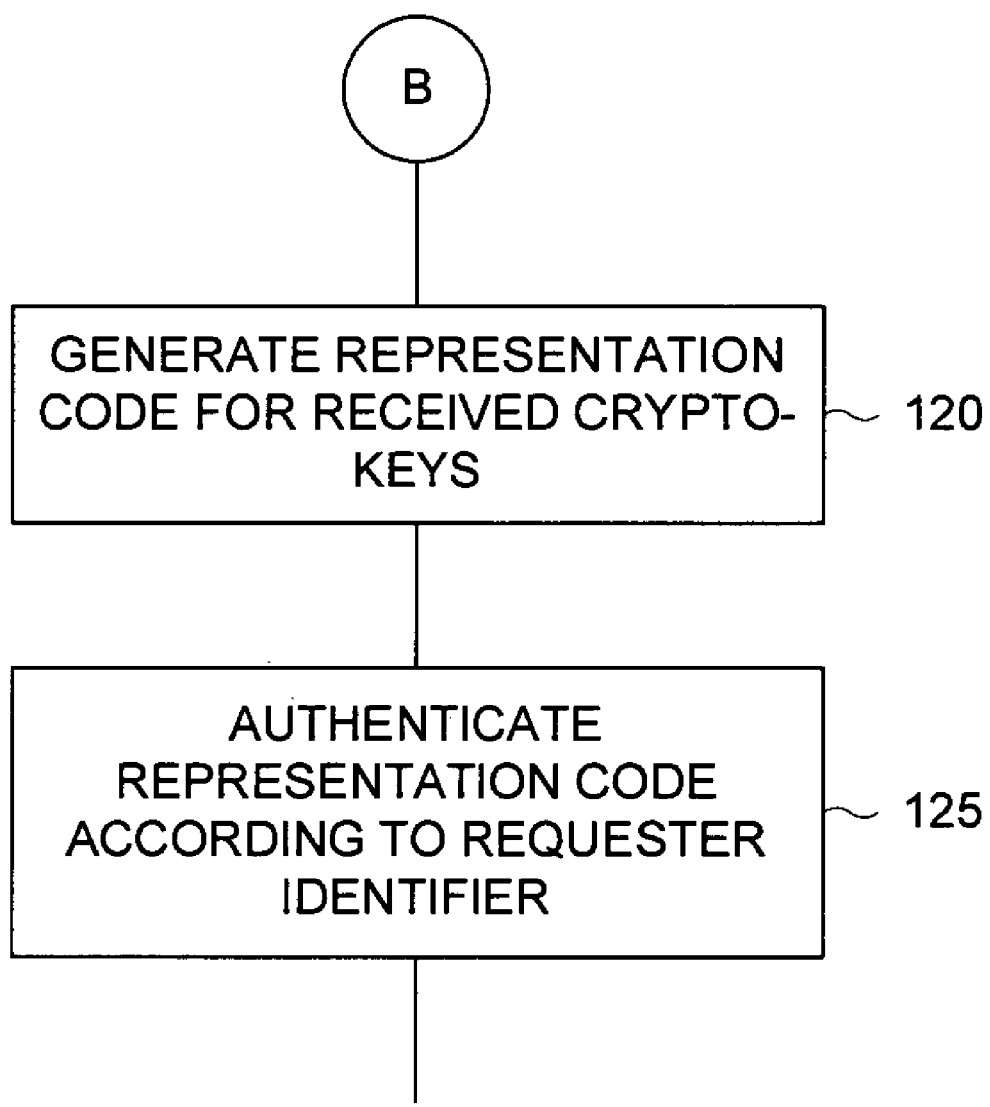
FIG. 6 is a flow diagram that depicts an alternative method for obtaining a cryptographic key.

FIG. 6 is a flow diagram that depicts an alternative method for obtaining a cryptographic key. According to one alternative illustrative method, once a crypto-key is obtained, a representation code is then generated according to the received cryptographic key (step 120). It should be appreciated that any form of representation code may be utilized in various alternative methods herein contemplated. According to one variation of the present method, a hash code is generated according to a received cryptographic key. According to yet another variation of present method a secure hash code is generated according to a received cryptographic key. One example of a secure hash code includes a hash code generated according to an algorithm known as "SHA-256". Once the representation code is generated, it is authenticated according to a requester identifier (step 125). It should be appreciated that the requester is typically identified by a requester identifier. According to one variation of the present method, the representation code is "signed" according to the requester identifier.

Figure 7:
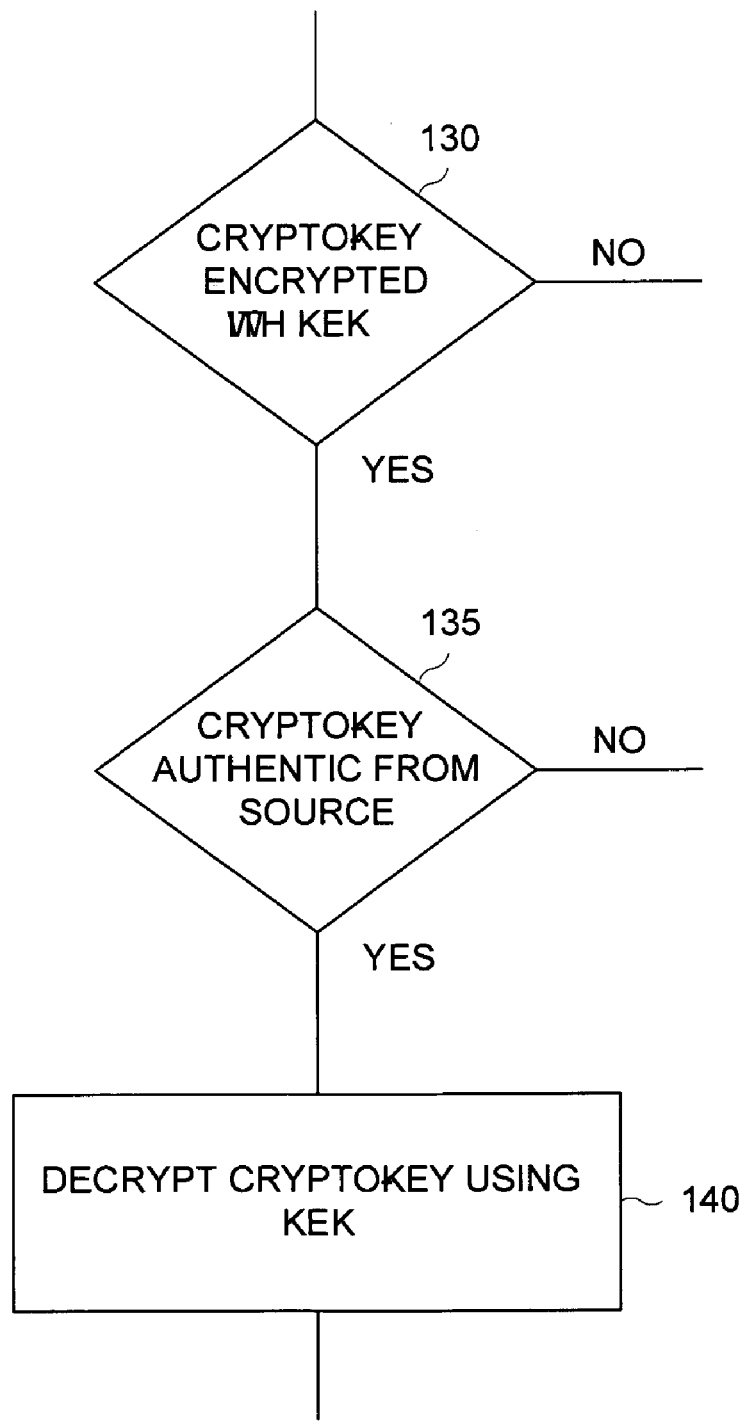
FIG. 7 is a flow diagram that depicts a variation of the present method for receiving multi-level cryptographic keys.

FIG. 7 is a flow diagram that depicts a variation of the present method for receiving multi-level cryptographic keys. It should be appreciated that a cryptographic dissemination system is often required to support multiple levels of security as it provides encryption keys to a requester. According to one variation of the present method, a cryptographic key that is received from a key source is encrypted at a first level. This first level of encryption is decrypted using the source credential, the requester credential and a pre-placed certificate as heretofore described. Once decrypted in this manner, the cryptographic key of this alternative method is still encrypted. Typically, the cryptographic key is still encrypted according to a key encryption key (KEK).

According to this alternative example method, when a crypto-key is encrypted with a key encryption key (step 130), the present method provides for determining the authenticity of the cryptographic key. Accordingly, such authentication is accomplished by authenticating the encrypted key back to an original source key (step 135). When it is determined that the cryptographic key that is encrypted with a key encryption key is authentic, it is decrypted using a key encryption key (step 140).

Figure 8:
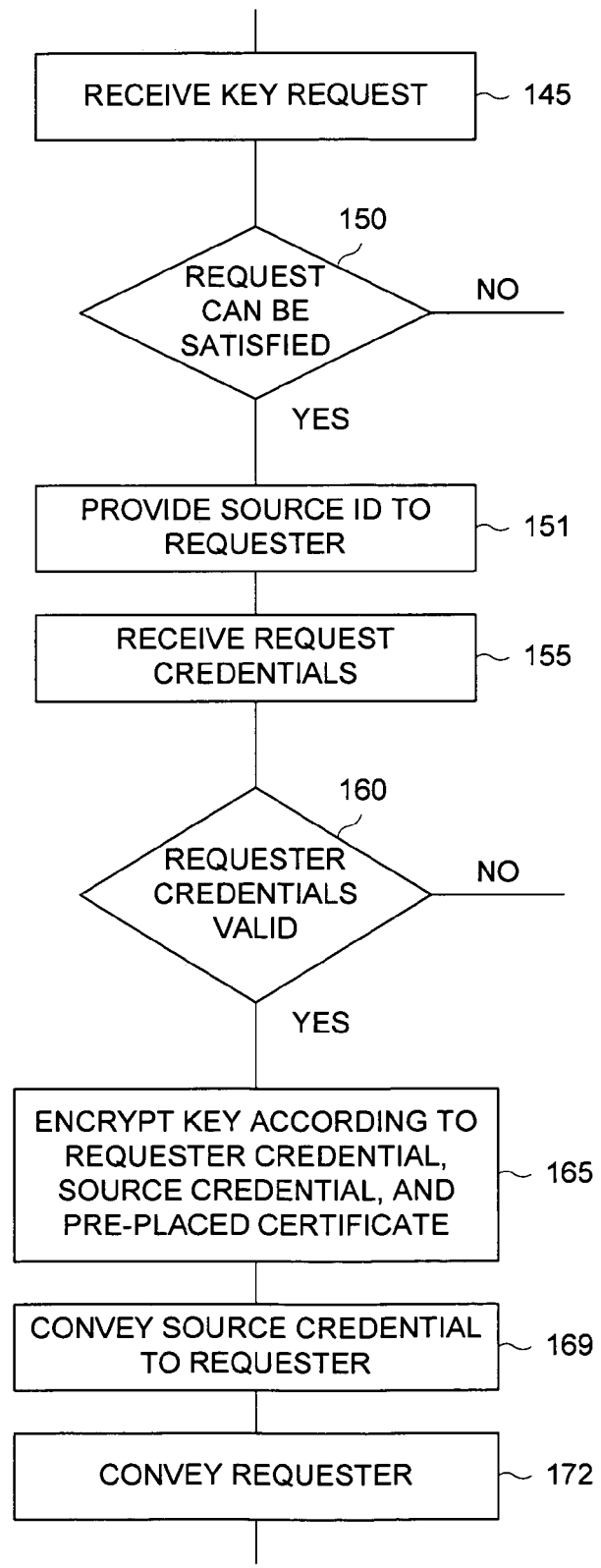
FIG. 8 is a flow diagram that depicts one example method for providing a cryptographic key.

FIG. 8 is a flow diagram that depicts one example method for providing a cryptographic key. It should be appreciated that in order to support a request for a cryptographic key received from a remote terminal (i.e. a requester), a key source must operate in a complementary manner. Accordingly, a method for providing a cryptographic key is herein set forth. According to this example method, a cryptographic key is provided by receiving a key request (step 145). A key source then determines whether or not it can satisfy the key request. This is accomplished by determining if the key source has access to a requested key. In an alternative method, this is accomplished by determining if a requester is valid using a permission list and a rejection list as described below. In the event that the key source can satisfy the key request (step 150), the key source key source issues a source identification message (step 151) to the key requester and then receives credentials from the requester (step 155).

In order to respond to request, the present method provides that a key source then determine whether or not the requester credentials received from the remote terminal are valid. When the requester credentials are valid (step 160), the key source then encrypts a requested cryptographic key according to a source credential, a requester credential and a counterpart to a certificate that has been pre-placed in the requester (step 165). A key source then conveys its source credentials to the requester (step 169). The key source then conveys the encrypted cryptographic key to the requester (step 172).

Figure 9:
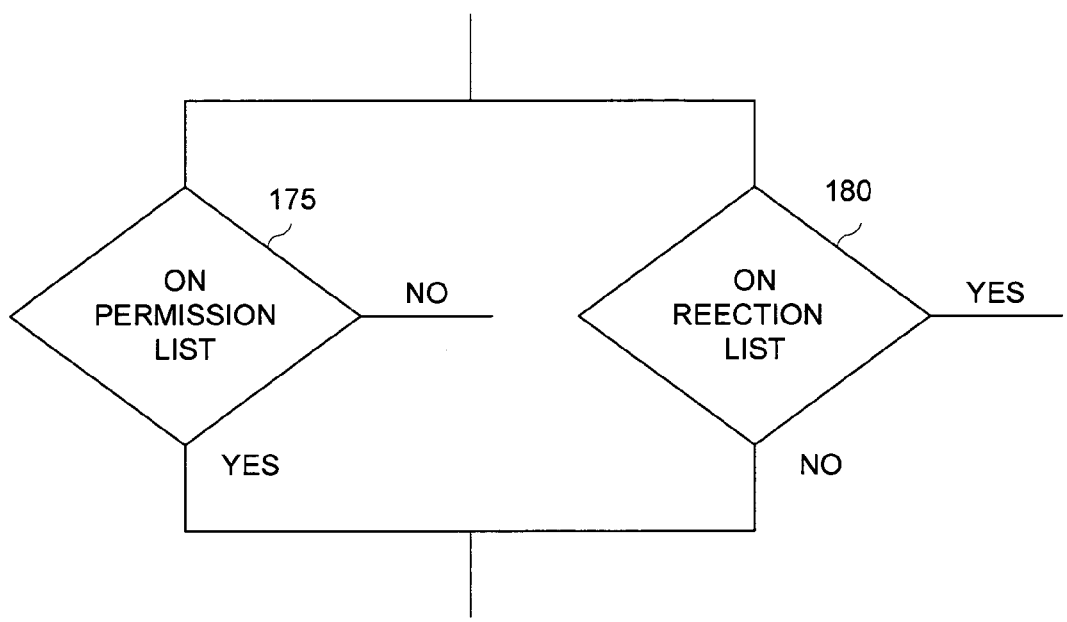
FIG. 9 is a flow diagram that depicts alternative example methods for determining the validity of a requester and a requester credential.

FIG. 9 is a flow diagram that depicts alternative example methods for determining the validity of a requester and a requester credential. According to one alternative example method, the validity of a requester or a requester credential is determined by determining whether or not the requester or the requester credential is included in a permission list (step 175). It should be appreciated that determining whether or not a requester is included on a permission list is, according to yet another variation of the present method, accomplished by a determining whether or not a requester identifier is included in the permission list.

It should be appreciated that in hostile applications (e.g. a battle theater), there are instances where a remote terminal may be compromised. For example, a remote terminal may be captured by enemy forces. In this situation, it may be necessary to update the permission list. However, a permission list is typically updated only on a periodic basis and such update is typically accomplished in a trusted manner, for example by means of a data transfer device. A data transfer device is a physical apparatus that needs to be physically connected to a key source in order to update the permission list.

According to one alternative example method, determining whether or not a requester or a received requester credential is valid is accomplished by determining whether or not the requester or a requester credential is included in a rejection list (step 180). The rejection list is typically updated in a wireless manner since it is less vulnerable to security concerns. Accordingly, when a requester identifier is not included in the rejection list, the requester is said to be valid. When a requester credential received from the requester is not included in the rejection list, the requester credential is also said to be valid.

FIG. 2 further illustrates that, according to one alternative variation of the present method, a second cryptographic key is received wherein the second cryptographic key is encrypted according to the first cryptographic key that was received and decrypted according to the present method (step 42). In this manner, a first cryptographic key is obtained by means of a first level of security (e.g. by modifying a secure manner at least one of frequency, phase and amplitude of a carrier that is modulated according to information conveyed between a requester and a key source). According to one variation of the present method, modification of a carrier is accomplished by modifying at least one of a frequency, a phase, an amplitude, a start time, jitter, encoding code, modulation code, modulation type, polarization modulation, pulse rise time, pulse fall time, bit ordering and interleaving exhibited by the modulated carrier according to a secure algorithm. Once the first cryptographic key is obtained in this manner, it is used to decrypt other cryptographic keys that are secured at a second level of security (e.g. COMSEC).

Figure 10:
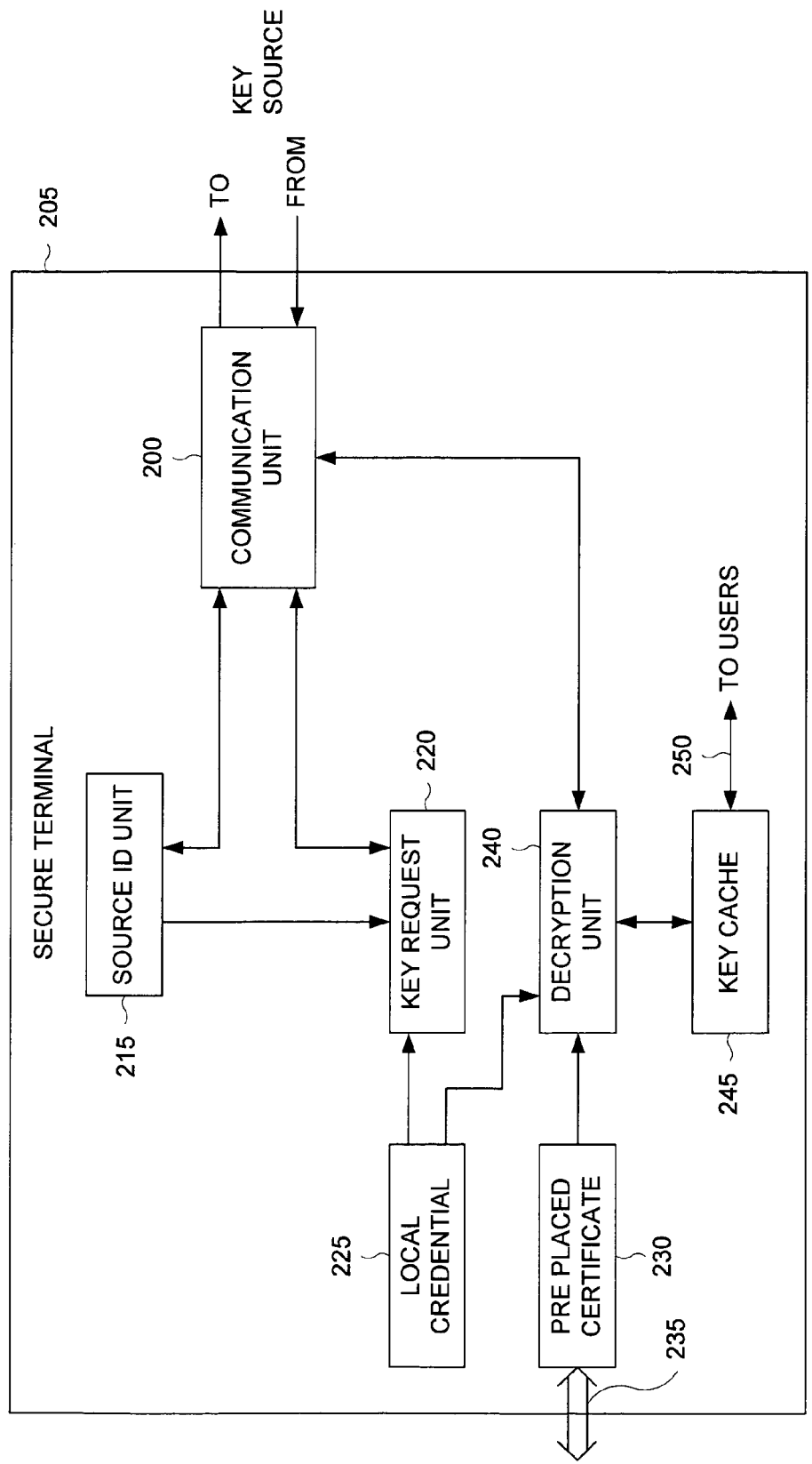
FIG. 10 is a block diagram that depicts one example embodiment of a secure terminal.

FIG. 10 is a block diagram that depicts one example embodiment of a secure terminal. According to this example of embodiment, a secure terminal 205 comprises a pre-placed certificate register 230, a communications unit 200, a source identification unit 215, a key request unit 220, and a decryption unit 240. In operation, the source identification unit 215 uses a communications unit 200 to communicate with potential key sources. According to this example embodiment, the source identification unit dispatches a key request to a potential key source by means of the communications unit 200. The communications unit 200 propagates the key request to a key source.

In response, one or more key sources convey source identification messages back to the communications unit 200. The communications unit 200 directs a received source identification message back to the source identification (ID) unit 215. The source identification unit 215 then selects a particular key source according to one or more received source identification messages.

Once the source identification unit 215 selects a particular key source, it passes the selection on to the key request unit 220. The key request unit 220 then generates a key request that includes a local credential, which is obtained from a local credential register 225 included in this example embodiment of a secure terminal 205. The key request unit 220 then directs the key request that includes a local credential to the communications unit 200. It should be appreciated that the key request is targeted to a particular key source as identified by a key source signal generated by the source identification unit 215. The communications unit 200 then propagates the key request to a particular key source.

The communications unit 200 is further capable of receiving an encrypted key along with a source credential from a particular key source. The communications unit 200 then directs the encrypted key and the source credential to the decryption unit 240. The decryption unit 240 decrypts the encrypted key according to the received source credential, local credential and a pre-placed certificate, which is stored in the pre-placed certificate register 230. It should be appreciated that, according to one alternative example embodiment, a secure terminal 205 further comprises a data transfer device interface 235, which is used to store a certificate in the pre-placed certificate register 230. The decryption unit 240 then places a decrypted key into a key cache 245, which is included in one alternative example embodiment of a secure terminal 205. A decrypted key is then made available 250 to a user.

Figure 11:
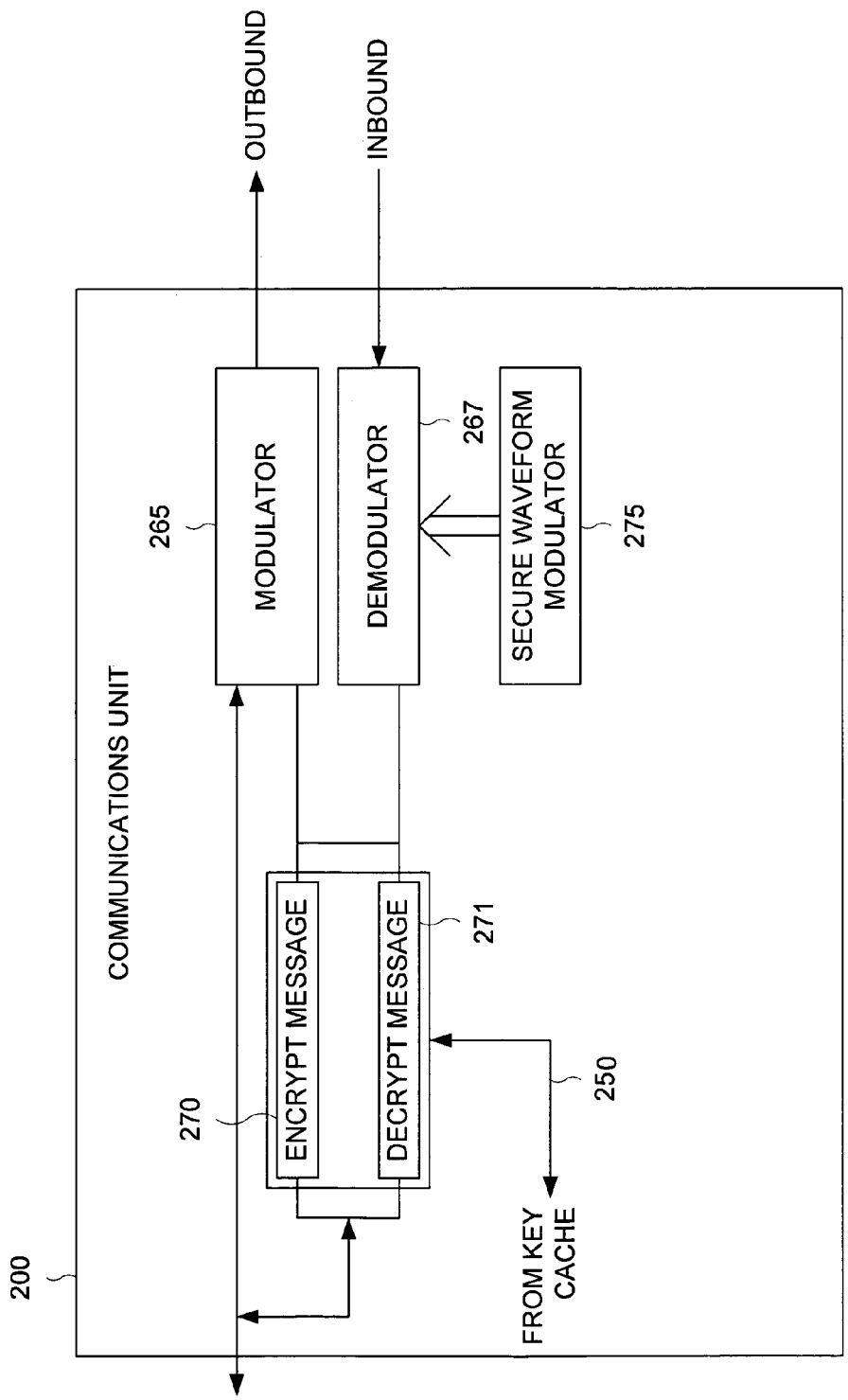
FIG. 11 as a block diagram that depicts alternative example embodiments of a communications unit.

FIG. 11 as a block diagram that depicts alternative example embodiments of a communications unit. According to one alternative example embodiment, a communications unit 200 to comprises a modulator 265 and a demodulator 267. When information arrives at the communications unit 200, the modulator 265 generates an outbound carrier according to the data received from at least one of the source identification unit 215 and the key request unit 220. The outbound carrier is then directed to one or more potential key sources (e.g. by radiating carrier energy into free space). The demodulator 267 receives an inbound carrier and extracts data from the inbound carrier. The demodulator 260 provides the extracted data to at least one of the source identification unit 215, the key request unit 220 and the decryption unit 240.

This alternative example embodiment of the communications unit 200 further comprises a secure waveform modulator 275. The secure waveform modulator 275 of this alternative example embodiment causes the modulator 265 to modify an outbound carrier according to a secure modification algorithm that is stored in the secure waveform modulator 275. The secure waveform modulator 275 of this alternative example embodiment also causes the demodulator 267 to modify extraction of data from an inbound carrier according to the secure modification algorithm stored in the secure waveform modulator 275. According to one alternative example embodiment, the secure waveform modulator 275 comprises a TRANSEC compliant secure waveform modulator. According to an alternative example embodiment, the secure waveform modulator 275 causes the modulator 265 to modify a generated carrier and causes the demodulator 267 to modify extraction of data from a carrier by modifying at least one of a frequency, a phase, an amplitude, a start time, jitter, encoding code, modulation code, modulation type, polarization modulation, pulse rise time, pulse fall time, bit ordering and interleaving exhibited by the modulated carrier according to a secure algorithm.

According to another alternative example embodiment, the communications unit 200 further comprises a message encryption unit 270 and a message decryption unit 271. In operation, the message encryption unit encrypts data received from at least one of the source identification unit 215 and the key request unit 220. It should be appreciated that the message encryption unit 270 encrypts information according to an encryption key stored in the key cache 245. An encryption key stored in the key cache 245 is also used by the message decryption unit 271 in order to decrypt information provided by the demodulator 267 before that information is directed to at least one of the source identification unit 215, the key request unit 220 and the decryption unit 240.

Figure 12:
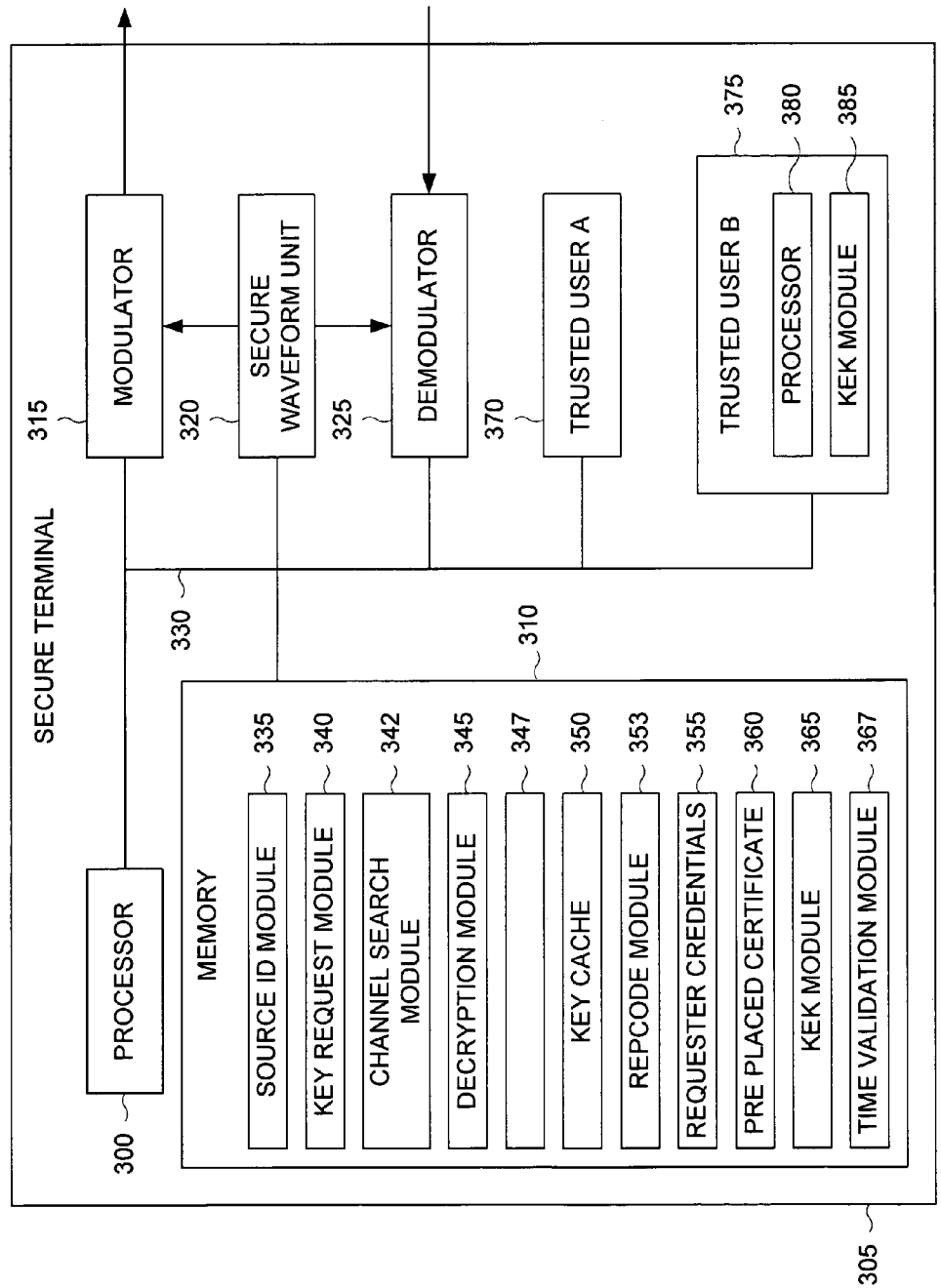
FIG. 12 is a block diagram that depicts several alternative example embodiments of a processor-based secure terminal.

FIG. 12 is a block diagram that depicts several alternative example embodiments of a processor-based secure terminal. According to one alternative example embodiment, a secure terminal 305 comprises a processor 300, a modulator 315, a demodulator 325 and a memory 310. According to one alternative example embodiment, a secure terminal 305 further includes a first trusted user 370 (i.e. "Trusted User A"). Accordingly to yet another alternative example embodiment, a secure terminal 305 further includes a second trusted user 375. The second trusted user, which may be referred to as "Trusted User B", includes a processor 380 and a key encryption key module 385 which is stored in a memory included in the second trusted user 375. The aforementioned elements are communicatively associated with each other by means of a bus 330. It should be appreciated that various means for communicatively associating these elements may be used and the scope of the claims pending hereto is not intended to be limited to any particular example of interconnecting these elements in a communicatively associative manner.

According to one alternative illustrative embodiment, a secure terminal 305 further includes a secure waveform unit 320. The secure waveform unit 320 causes the modulator 315 to modify a carrier according to a secure modification algorithm. It should be appreciated that the modulator 315 generates a carrier according to information received from the processor 300. According to yet another illustrative embodiment, the secure waveform unit 320 causes the demodulator 325 to alter a demodulation process applied to an inbound carrier. It should be appreciated that the demodulator 325 demodulates an inbound carrier according to directives received from the secure waveform unit 320 and provides data, which results from this demodulation process, to the processor 300. It should also be appreciated that the secure waveform unit 320 causes the modulator 315 to modify, according to a secure modification algorithm, at least one of a frequency, a phase and an amplitude exhibited by a generated carrier. According to one alternative example embodiment, the secure waveform unit 320 comprises a TRANSEC compliant secure waveform unit. According to an alternative example embodiment, the secure waveform unit 320 causes the modulator 315 to modify a generated carrier and causes the demodulator 325 to modify extraction of data from a carrier by modifying at least one of a frequency, a phase, an amplitude, a start time, jitter, encoding code, modulation code, modulation type, polarization modulation, pulse rise time, pulse fall time, bit ordering and interleaving exhibited by the modulated carrier according to a secure algorithm.

According to one alternative example embodiment, a secure terminal 305 further includes various functional modules, each of which comprises an instruction sequence that can be executed by the processor 300. An instruction sequence that implements a functional module, according to one alternative embodiment, is stored in the memory 310. The reader is advised that the term "minimally causes the processor" and variants thereof is intended to serve as an open-ended enumeration of functions performed by the processor 300 as it executes a particular functional module (i.e. instruction sequence). As such, an embodiment where a particular functional module causes a processor to perform functions in addition to those defined in the appended claims is to be included in the scope of the claims appended hereto. Included in one example embodiment of a secure terminal 305 are a source identification module 335, a key request module 340 and a decryption module 345. Another example embodiment of a secure terminal 305 further includes a channel security module 342. In yet another alternative example embodiment, the secure terminal 305 further includes a representation code module 353. And in yet another alternative example embodiment, the secure terminal 305 further comprises a key encryption key (KEK) module 365. In one additional illustrative embodiment, the secure terminal 305 further comprises a time validation module 367. It should be appreciated that all these functional modules are stored in the memory 310. It should also be noted that, according to various illustrative embodiments, the memory 310 is used to store at least one of a key cache 350, a requester credential 355 and a pre-placed certificate 360.

The functional modules (and their corresponding instruction sequences) described thus far that enable ad hoc reception of a cryptographic key, according to one alternative embodiment, are imparted onto computer readable medium. Examples of such medium include, but are not limited to, random access memory, read-only memory (ROM), Compact Disk (CD) ROM, Digital Versatile Disk (DVD), floppy disks, hard disk drives and magnetic tape. Yet other examples include, but are not limited to a software download channel wherein an instruction sequence is received by means of a communications channel and then stored in the memory 215. These forms of computer readable medium, which alone or in combination can constitute a stand-alone product, can be used to convert a general-purpose computing device into a secure terminal that is capable of obtaining a cryptographic keys according to the techniques and teachings presented herein. Accordingly, the claims appended hereto are to include such computer readable medium imparted with such instruction sequences that enable execution of the present method and all of the teachings herein described.

Figure 13:
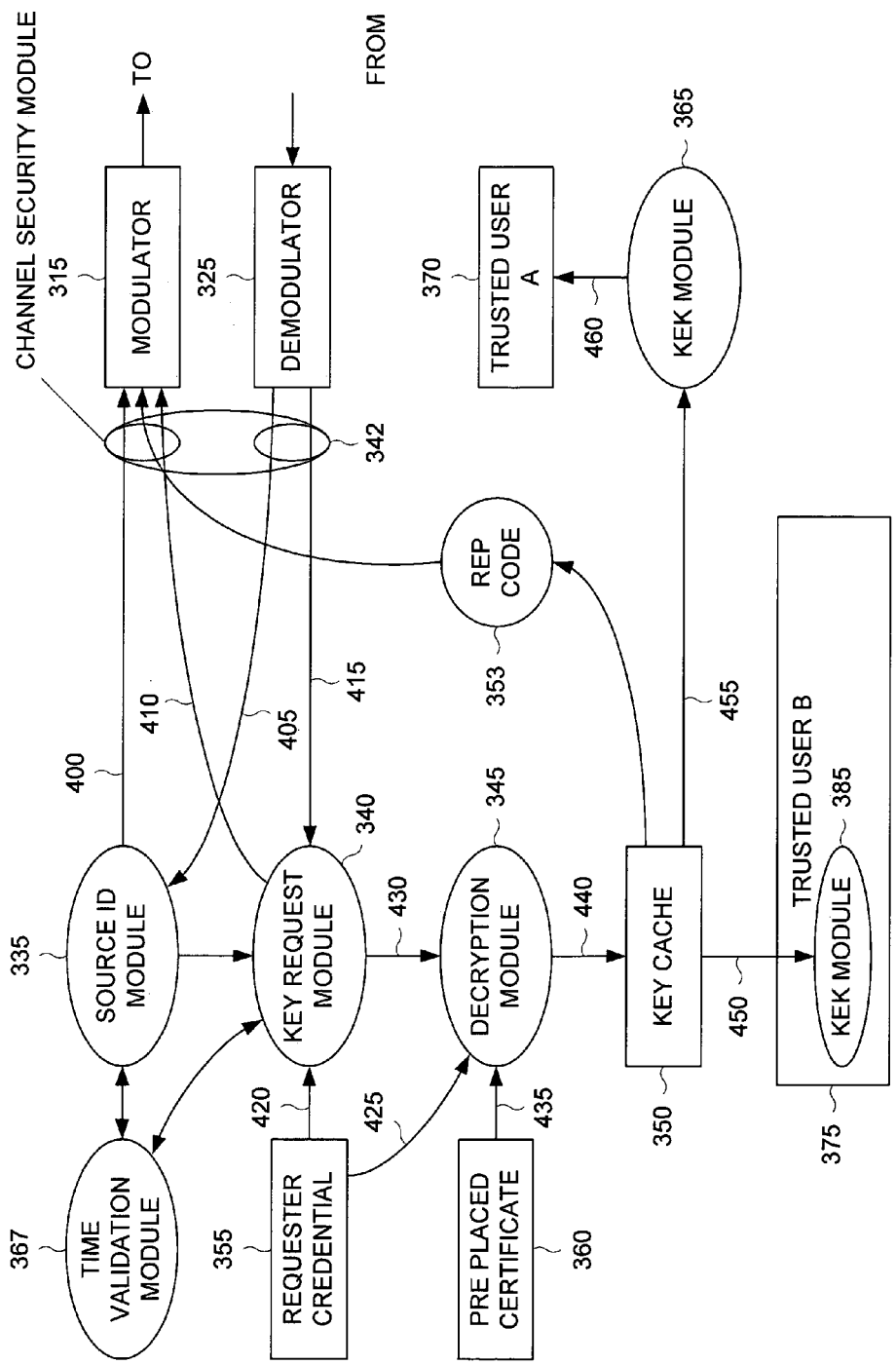
FIG. 13 is a data flow diagram that depicts the internal operation of various example embodiments of a secure terminal.

FIG. 13 is a data flow diagram that depicts the internal operation of various example embodiments of a secure terminal. According to one alternative example embodiment, the processor 300 executes a source identification module 335. When executed by the processor 300, the source identification module 335 minimally causes the processor 300 to convey a key request 400 to the modulator 315. The modulator 315 propagates the key request to one or more potential key sources. The demodulator 325 receives one or more source identification messages from one or more potential key sources. The one or more source identification messages are then directed back 405 to the source identification module 335. The processor 300, as it continues to executes the source identification module 335, is further minimally caused to select a key source according to the one or more source identification messages received 405 from the demodulator 325. As such, the source identification module 335 further minimally causes the processor to provide a key selection indicator 336 to the key request module 340.

As the processor 300 executes the key request module 340, it is further minimally caused to convey 410 to the modulator 315 a requester credential message. The key request module 340 causes the processor 300 to create a requester credential message that includes a requester credential 355 that is retrieved 420 from the memory 310. The modulator 315 propagates the requester credential message to a selected key source. The demodulator 325 then receives from a selected key source an inbound carrier. The demodulator 325 extracts an encrypted cryptographic key and a source credential from the inbound carrier and provides these to the key request module 340.

The key request module 340, as it is executed by the processor 300, further minimally causes the processor 300 to provide 430 the received 415 encrypted cryptographic key and source credential to the decryption module 345. The decryption module 345, when executed by the processor 300, minimally causes the processor 300 to decrypt the received cryptographic key according to the received source credential, the requester credential, which is retrieved 425 from the memory 310, and a pre-placed certificate 360, which is also retrieved 435 from the memory 310. The decryption module 345 further minimally causes the processor to store a decrypted cryptographic key in a portion of the memory 310 known as the key cache 350.

According to one alternative example embodiment, the secure terminal 305 further includes the channel security (CHANSEC) module 342 which is also stored in the memory 310. When executed by the processor 300, the channel security module 342 minimally causes information received from the source identification module (data path 400) and the key request module (data path 410) to be encrypted according to a cryptographic key stored in the key cache 350 before it reaches the modulator 315. The channel security module 342, when executed by the processor 300, further minimally causes information provided by the demodulator 325 to the source identification module (date path 405) and the key request module (date path 340) to be decrypted according to a cryptographic key stored in the key cache 350. It should be appreciated that, according to one alternative example embodiment, the channel security module 342 organizes information flowing to the modulator 315 and from the demodulator 325 as COMSEC compliant messages.

According to one alternative example embodiment, the secure terminal 305 further includes a representation code (REP CODE) module 353. The representation code module 353 minimally causes the processor 300 to generate a representation code, for example a secure hash code, according to a decrypted cryptographic key stored in the key cache 350. One example of a secure hash code comprises a hash code generated according to the SHA-256 algorithm. Once the processor 300 generates the representation code, this example embodiment of a representation code module 353 further minimally causes the processor to convey the representation code to the modulator 315. The modulator 315 propagates the representation code to a particular key source as an acknowledgment that a cryptographic key was properly received and decrypted by the secure terminal 305.

According to yet another alternative example embodiment, the secure terminal 305 further includes a key encryption key (KEK) module 365. The key encryption key module 365, when executed by the processor 300, minimally causes the processor 300 to further decrypt a cryptographic key stored in the key cache 350. Accordingly, the processor is caused to retrieve 455 a cryptographic key from the key cache 350 and decrypt the cryptographic key according to a key encryption key. It should be appreciated that this example embodiment of a key encryption key module 385 also minimally causes the processor to authenticate a cryptographic key back to the original key source. According to one alternative embodiment, the key encryption key module 365 causes the processor 300 to authenticate a cryptographic key according to a digital signature applied to the cryptographic key by an original key source. The key encryption key module 365 further minimally causes the processor 300 to convey 460 the decrypted cryptographic key to a first trusted user 370. It should be appreciated that, according to one alternative example embodiment, a version of the key encryption key module 385 is included in a second trusted user 375. In this alternative example embodiment, the processor included in the second trusted user 375 executes the key encryption key module 385 stored therein in order to retrieve 450 from the key cache 350 a cryptographic key that is encrypted according to a key encryption key. The key encryption key module 385 executed by the processor included in the second trusted user 375 then performs decryption according to the methods specified herein.

It should be appreciated that an ad hoc transaction to obtain a cryptographic key from a key source includes various messages that flow between a secure terminal and a key source. These various messages include, but are not limited to, a key request that is dispatched by the source identification module 335 to one or more potential key sources, a requester credential message dispatched by the key request module to a particular key source and a key/source credential message that is received from a particular key source by the key request module of this example embodiment of a secure terminal. According to one alternative example embodiment, the secure terminal 305 further includes a time validation module 367. The time validation module 367, when executed by the processor 300, minimally causes the processor 300 to validate any or all of these messages that are included in an ad hoc transaction to obtain a cryptographic key. It should be appreciated that such validation is accomplished by minimally causing the processor to validate a transaction by means of a timestamp included in any or all of these messages. When the timestamp is inconsistent with a current time of day or system time, the validation module 367 further minimally causes the processor to engage in remedial activities. Such remedial activities, according to one alternative example embodiment, include termination of the ad hoc message sequence and recording of a potential compromise in the security of the transaction.

Figure 14:
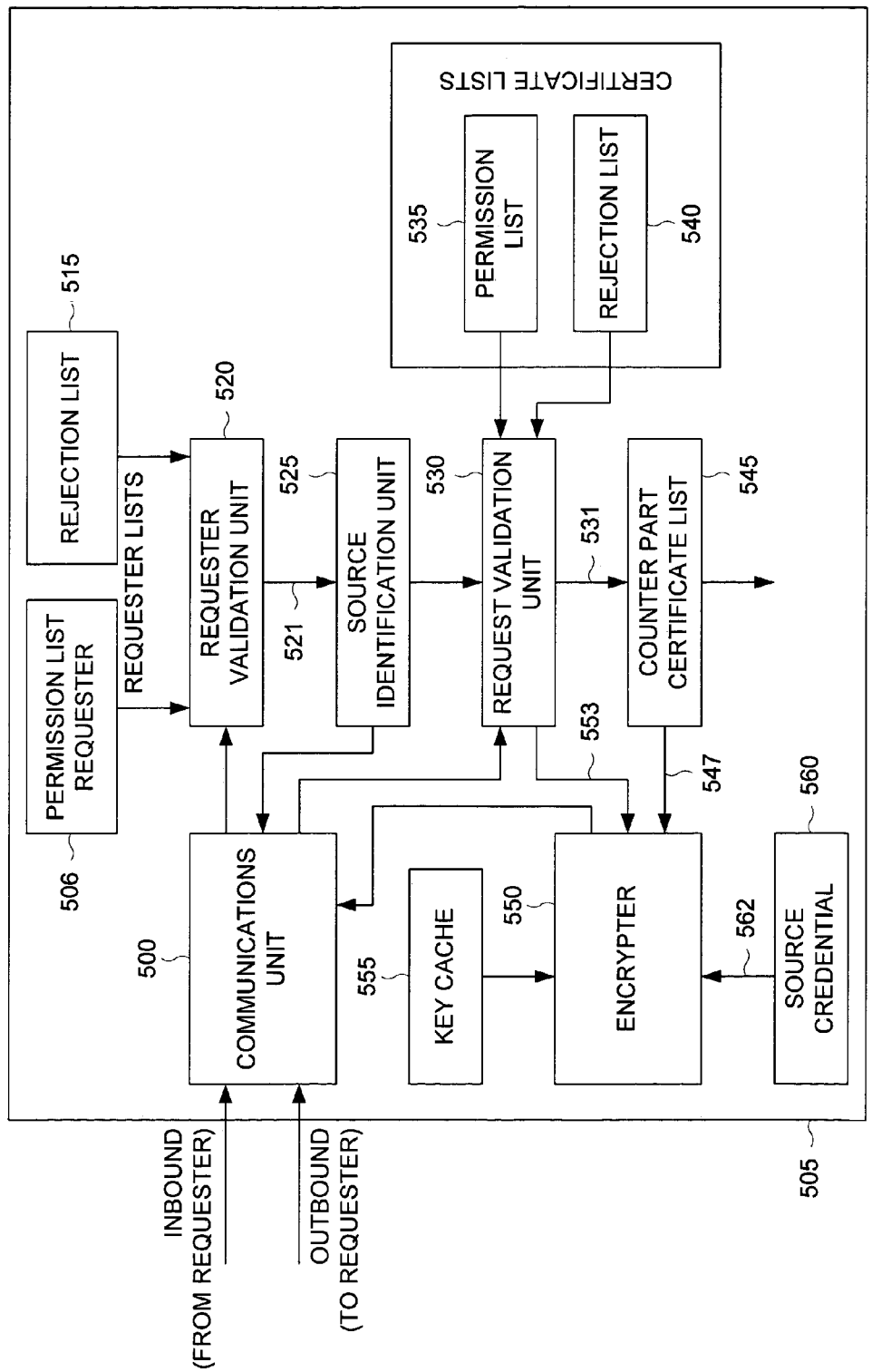
FIG. 14 is a block diagram that depicts one example of embodiment of a key source.

FIG. 14 is a block diagram that depicts one example of embodiment of a key source. According to this example embodiment, a key source 505 comprises a communications unit 500, which is capable of communicating with a key requester. The key source 505 further comprises a requester validation unit 520. The requester validation unit 520 receives a key request from the communications unit 500. It should be appreciated that the communications unit 500 itself receives a key request from a distal key requester. When the requester validation unit 500 determines that the key request has been received from a valid requester, the requester validation unit 520 generates a valid requester signal 521. In response to the valid requester signal 521, a source identification unit 525 included in this example embodiment directs a source identification message to a key requester by means of the communications unit 500. It should be appreciated that a source identifier message typically includes a key source identifier. The communications unit 500 then stands ready to receive a requester credential message that is targeted to a particular key source.

When the communications unit 500 receives a requester credential message, it directs the requester credential message to the requester validation unit 530. The requester validation unit 530 determines whether or not the requester credential message includes a valid requester credential. In the case where the requester credential message includes a valid requester credential, the request validation unit 530 generates a valid request signal 531.

This example embodiment of a key source 505 further includes a key cache 555. The key cache 555 is capable of storing one or more cryptographic keys. This example embodiment of a key source 505 further comprises an encryption unit 550. The encryption unit 550 receives a cryptographic key from the key cache 555 and then generates an encrypted representation of that cryptographic key. The encrypted representation of the cryptographic key is generated by encrypting the cryptographic key according to a source credential 562, which is typically stored in a source credential register 560, a received requester credential 553 and a counterpart 547 to a certificate that has been pre-placed in the requester. According to one example embodiment, the key source 505 further comprises a counterpart certificate list 545, which is used to store counterpart certificates that are in part used to encrypt a cryptographic key stored in the key cache 555.

In one alternative example embodiment, the requester validation unit 520 determines when a key request arriving by means of the communications unit 500 by comparing a requester identifier included in the key request to entries in a requester permission list 506 and to entries in a requester rejection list 515. So long as the requester identifier is found in the requester permission list 506 and is not found in the requester rejection list 515, the requester validation unit 520 will validate a key request according to such requester identifier.

In yet another alternative example embodiment, the request validation unit 530 determines whether or not a requester credential is valid by comparing a requester credential to entries in a credential permission list 535 and to entries in a credential rejection list 540. So long as the requester credential is found in the credential permission list 506 and is not found in the credential rejection list 515, the request validation unit 530 will validate a requester credential message.

While the present method and apparatus have been described in terms of several alternative methods and embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for obtaining a cryptographic key comprising:
dispatching a key request to a communications channel;
receiving a response from one or more key sources from the communications channel;
selecting a key source according to one or more responses from one or more key sources;
preparing a requester credential;
communicating the requester credential to the selected key source;
receiving a source credential from the selected key source;
receiving an encrypted first cryptographic-key from the selected key source; and
decrypting the received encrypted first cryptographic-key according to the received source credential, the requester credential and a pre-placed certificate.

2. The method of claim 1 wherein dispatching a key request to a communications channel comprises:
generating a modulated carrier according to a key request; and
modifying at least one of a frequency, a phase, an amplitude, a start time, jitter, encoding code, modulation code, modulation type, polarization modulation, pulse rise time, pulse fall time, bit ordering and interleaving exhibited by the modulated carrier according to a secure algorithm.

3. The method of claim 1 wherein dispatching a key request to a communications channel comprises:
encrypting the key request according to a communications channel encryption key;
generating a modulated carrier according to the encrypted key request; and
modifying at least one of a frequency, a phase, an amplitude, a start time, jitter, encoding code, modulation code, modulation type, polarization modulation, pulse rise time, pulse fall time, bit ordering and interleaving exhibited by the modulated carrier according to a secure algorithm.

4. The method of claim 1 further comprising validating the received source credential according to a time stamp included therein.

5. The method of claim 1 further comprising:
generating a representation code for the received first cryptographic key;
authenticating the representation code according to a requester identifier; and
dispatching the authenticated representation code to the key source.

6. The method of claim 1 further comprising:
determining the authenticity of the cryptographic-key as an original source key when a cryptographic-key is still encrypted with a key encryption key; and
decrypting the cryptographic key according to a key encryption key when the encrypted cryptographic-key is authentic.

7. The method of claim 1 further comprising:
receiving a second cryptographic key in a message that is encrypted according to the decrypted received cryptographic key.

8. A method for providing a cryptographic key comprising:
receiving a key request on a communications channel;
determining if the key request can be satisfied;
responding to the key request with a source identifier when the key-request can be satisfied;
receiving a requester credential from a remote terminal;
determining when the requester credential is valid;
establishing a communications channel with the remote terminal when the requester credential is valid; and
encrypting a cryptographic key according to the requester credential, the source credential and a counterpart to a certificate that is pre-placed in the requester; and
conveying the encrypted cryptographic-key to the remote terminal using the communications channel.

9. The method of claim 8 wherein determining when the received key request can be satisfied comprises at least one of determining that they key requester is included in a permission list and determining that the key requester is not included in a rejection list.

10. The method of claim 8 wherein determining when the requester credential is valid comprises at least one of determining that the requester credential is included in a permission list and determining that the requester credential is not included in a rejection list.

11. A secure terminal comprising:
a pre-placed certificate register storing a pre-placed certificate received from a data transfer device;
a communications unit wirelessly communicating with a remotely located key source;
a source identification unit dispatching a key request by means of the communications unit, receiving a source identification message from the communications unit and further selecting a key source according to a received source identification message;
a key request unit incorporating a local credential into a key request, dispatching by means of the communications unit the key request to a key source selected by the source identification unit and receiving an encrypted key from the key source by means of the communications unit; and
a decryption unit receiving from the key source by means of the communications unit a source credential and further decrypting an encrypted key according to the source credential, the local credential and a pre-placed certificate stored in the pre-placed certificate register.

12. The secure terminal of claim 11 wherein the communication unit comprises:
a modulator generating a carrier according to data received from at least one of the source identification unit and the key request unit;
a demodulator extracting data from a carrier and providing the data to at least one of the source identification unit, the key request unit and the decryption unit; and
a secure waveform modulator modifying a carrier generated by the modulator and modifying the extraction provided by the demodulator according to a secure data algorithm by varying a frequency, a phase, an amplitude, a start time, jitter, encoding code, modulation code, modulation type, polarization modulation, pulse rise time, pulse fall time, bit ordering and interleaving.

13. The secure terminal of claim 11 wherein the communication unit comprises:
a message encryption unit encrypting data received from at least one of the source identification unit and the key request unit;
a modulator generating a carrier according to data encrypted by the encryption unit;
a demodulator extracting data from a carrier;

a message decryption unit decrypting data receive from the demodulator and providing decrypted data to at least one of the source identification unit, the key request unit and the decryption unit; and a secure waveform modulator modifying a carrier generated by the modulator and modifying the extraction provided by the demodulator according to a secure data algorithm by varying a frequency, a phase, an amplitude, a start time, jitter, encoding code, modulation code, modulation type, polarization modulation, pulse rise time, pulse fall time, bit ordering and interleaving.

14. A secure terminal comprising:

a processor executing an instruction sequence;

a modulator generating a carrier according to data received from the processor;

a demodulator providing data to the processor by demodulating a received carrier;

a memory storing one or more instruction sequences and information;

one or more instruction sequences stored in the memory including:

a source identification module that, when executed by the processor, minimally causes the processor to:
convey a key request to the modulator;
receive from the demodulator one or more key source identification messages; and
select a key source according to a received key source identification message;

a key request module that, when executed by the processor, minimally causes the processor to:
convey to the modulator a requester credential message that includes a requester credential; and
receive from the demodulator a source credential and an encrypted cryptographic key; and a decryption module that, when executed by the processor, minimally causes the processor to decrypt the received cryptographic key according to the received source credential, the requester credential and a preplaced certificate that is included in the memory.

15. The secure terminal of claim 14 further comprising a secure waveform modulator causing modification, according to a secure algorithm, a carrier generated by the modulator and a demodulation process performed by the demodulator.

16. The secure terminal of claim 14 further comprising:

a secure waveform modulator modifying according to a secure algorithm a carrier generated by the modulator and demodulation performed by the demodulator; and a channel security module stored in the memory that, when executed by the processor, minimally causes the processor to encrypt information conveyed to the modulator according to an encryption key stored in the memory and decrypt information received from the demodulator according to an encryption key stored in the memory.

17. The secure terminal of claim 14 further comprising a representation code module stored in the memory that, when executed by the processor, minimally causes the processor to:
generate a representation code according to a received decrypted cryptographic key; and
convey the representation code to the modulator.

18. The secure terminal of claim 14 further comprising a key encryption key module stored in the memory that, when executed by the processor, minimally causes the processor to further decrypt according to a key encryption key a cryptographic key stored in the memory when the cryptographic key is authenticated to an original key source and when said cryptographic key is still encrypted according to a key encryption key.

19. The secure terminal of claim 14 further comprising a time validation module that, when executed by the processor, minimally causes the processor to validate any portion or all of a key request transaction according to a time stamp included therein.

20. A key source apparatus comprising:

a wireless communications unit communicating with a remotely located key requester;

a requester validation unit generating a valid requester signal when a key request received by the communications unit is valid;

a source identification unit directing a source identification message to a key requester by means of the communications unit in response to the valid requester signal;

a request validation unit generating a valid request signal when a requester credential message is received by the communications unit from a key requester;

a key cache storing one or more cryptographic keys;

a key encryption unit encrypting a cryptographic key stored in the key cache, wherein said encryption is accomplished according to a source credential, a received requester credential and a counterpart to a certificate that has been pre-placed in the key requester and wherein the key encryption unit directs an encrypted cryptographic key to a key requester by means of the communications unit.

21. The key source of claim 20 further comprising a permission list and a rejection list and wherein the permission list and the rejection list are used by the requester validation unit as an input to a comparison used to generate the valid requester signal and are further used by the request validation unit as an input to a comparison used to generate a valid request signal.

* * * * *